United States Patent [19]
Wright, Jr.

[11] 3,983,965
[45] Oct. 5, 1976

[54] ADJUSTABLE LOCKING STRUT

[75] Inventor: William S. Wright, Jr., Corona Del Mar, Calif.

[73] Assignee: Pacific Scientific Company, Anaheim, Calif.

[22] Filed: July 7, 1975

[21] Appl. No.: 593,466

[52] U.S. Cl. .............................. 188/1 B; 188/129; 248/54 R
[51] Int. Cl.² ............................................ F16F 7/10
[58] Field of Search ............ 188/1 R, 1 B, 1 C, 2 R, 188/129, 189; 192/8 R; 248/54 R, 54 CS, 59

[56] References Cited
UNITED STATES PATENTS

| | | | |
|---|---|---|---|
| 1,165,583 | 12/1915 | Farmer .............................. | 188/189 |
| 2,471,857 | 5/1949 | Bleakney et al. ............... | 188/129 X |
| 2,838,137 | 6/1958 | Wallerstein ........................ | 188/1 B |
| 3,059,727 | 10/1962 | Fuchs ................................. | 188/1 B |
| 3,706,361 | 12/1972 | Paulssen et al. .................... | 188/189 |

Primary Examiner—Duane A. Reger
Attorney, Agent, or Firm—Knobbe, Martens, Olson, Hubbard & Bear

[57] ABSTRACT

An adjustable locking strut is connected to a pair of relatively movable mechanical elements and permits relative motion between these elements below a predetermined motion threshold. Above this predetermined motion threshold, relative movement between the mechanical elements is prohibited through the engagement of nonoverhauling threaded members connected to the mechanical elements. These nonoverhauling threaded members are specially designed so that, when synchronized, they do not engage one another. A synchronizing, overhauling threaded member is utilized to maintain the nonoverhauling threaded elements synchronized below the predetermined motion threshold, but is inoperative above the predetermined motion threshold so that said relative motion between the mechanical elements is prohibited above this threshold.

34 Claims, 15 Drawing Figures

ADJUSTABLE LOCKING STRUT

BACKGROUND OF THE INVENTION

This invention relates to motion controlling struts or vibration arrestors, and more particularly to a strut which may be connected between relatively movable elements, such as a steam pipe in a power producing station and adjacent supporting structure, to limit motion between the steam pipe and the structure, or any pair of relatively movable mechanical elements.

The prior art discloses a diverse assortment of approaches to various motion arresting problems. In particular, many attempts have been made in the prior art to arrest the motion between piping systems in thermal power plants and between various components of artillery pieces, for example, to limit the recoil of such apparatus. Some of these devices include an overhauling lead screw which is rotationally and axially fixed to one of the movable elements. Such lead screws are typically used to rotationally drive an axially-spring-centered braking device which, under normal circumstances, is centered axially between a pair of braking surfaces. These braking devices engage one of the braking surfaces as the motion parameter, typically acceleration, is increased.

The primary difficulty which has been encountered with devices of this type is the fact that the entire load which is to be supported by the motion arrestor must be borne by the overhauling threaded member, even under circumstances where the braking mechanism is engaged. This constraint severely limits the construction of the overhauling threaded member and also limits the load which may be supported by the motion arrestor.

While some attempts have been made to remove the overhauling threaded member from the main load bearing assembly, the resulting devices are typically extremely complex in construction and utilize a spring-centered braking arrangement which is itself subject to failure under mechanical stress.

SUMMARY OF THE INVENTION

The present invention permits the manufacture of a motion arresting device which may be subjected to extremely high mechanical forces without damage to the arrestor, but which nevertheless permits simplicity of design and construction, thereby increasing both the dependability and cost efficiency of the arrestor device.

In addition, the present invention includes an embodiment wherein a motion arrestor permits relative motion between a pair of mechanical elements below a predetermined velocity or acceleration threshold but which becomes a permanent rigid strut between these mechanical elements once the motion threshold has been exceeded, even after the force causing the relative motion between the mechanical elements subsides.

The structure which permits these desirable characteristics includes a pair of nonoverhauling threaded members which are specially designed to interengage without contact when axially synchronized. One of these nonoverhauling threaded elements is rigidly connected to one of the relatively movable mechanical elements. The other nonoverhauling threaded member is connected to the other relatively moving mechanical element through bearings which fix the axial position of the nonoverhauling threaded member relative this mechanical element but permit rotation about the axis of the threaded member relative the mechanical element.

An overhauling threaded element is connected to the first relatively movable mechanical element in a manner which prohibits rotation of this overhauling threaded member but which permits relative axial movement of the overhauling threaded member and the first relatively moving mechanical member when force is applied thereto. The overhauling threaded member is engaged with overhauling threads within the second nonoverhauling threaded member and is used to rotate this nonoverhauling threaded member to maintain axial synchronism between the pair of overhauling threaded members. When a predetermined force is applied to the overhauling threaded member, it will move axially relative the first relatively moving mechanical member so that synchronism can no longer be maintained between the nonoverhauling threaded members and these members engage, prohibiting further relative motion between the mechanical elements.

The device may be constructed in a manner which prohibits further synchronization of the nonoverhauling threaded members once the motion threshold has been achieved by permanently disabling the overhauling threaded member. Other embodiments are described in which the motion arrestor will work repeatedly, and the overhauling threaded member will disengage the nonoverhauling threaded members once the forces which have caused motion above the predetermined threshold have been removed.

The nonoverhauling threaded members directly support the forces causing excessive motion between the relatively moving mechanical elements, without the intervention of the overhauling lead screw, so that extremely high forces may be supported by this arrestor. In addition, the overall simplicity of the present design permits a compact, relatively inexpensive arrestor to support extremely large forces without damage to the arrestor.

These and other advantages of the present invention are best understood through a reference to the drawings in which.

DETAILED DESCRIPTION OF THE PREFERRED EMBODIMENT

Figure 1:
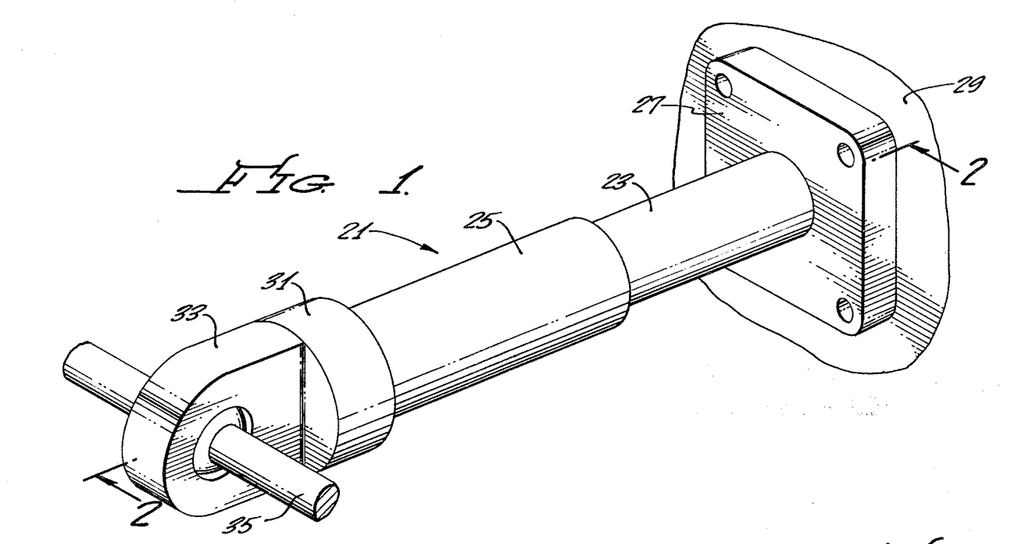
FIG. 1 is an overall perspective view of the locking strut or mechanical arrestor of the present invention mounted in a typical configuration between a mounting flange on a pipe and a rigid supporting pin.

Referring initially to FIG. 1, the adjustable locking strut or motion arrestor 21 of the present invention is shown to include a first telescoping member 23 and a second telescoping member 25. The telescoping member 23 is rigidly fixed, as through a mounting flange 27, to a supporting flange 29 which, in a particular installation, may be attached to a pipe in a thermal power plant. The second telescoping member 25 is rigidly connected, as through a threaded cap 31, to a pillow block 33. The block 33 may incorporate a spherical bearing for connection with a pin 35 used to connect the block 33 to a supporting structure or wall (not shown). While the motion arrestor 21 may be connected between a pipe flange 29, such as a steam pipe flange within a power producing station and an adjacent wall to which the pin 35 is mounted, it will be understood that the motion arrestor 21 is adaptable to a wide variety of uses, and, in particular, to any use wherein relative motion between two objects is to be permitted below a predetermined acceleration or velocity threshold (motion threshold) but is to be prohibited above this motion threshold. In particular, the present invention is particularly adaptable as a recoil arrestor in artillary pieces. Such motion arrestors permit movement or adjustment of the artillary piece at relatively slow speeds but prohibit motion between the artillary piece and its mounting base when the piece is fired by sensing velocity or acceleration above a predetermined threshold.

In the embodiment shown in FIG. 1, it will be understood by those skilled in the art that the pipe flange 29, which may for example be a steam pipe in a thermal energy plant, is subject to relatively slow thermal movement relative the adjacent wall as the pipe expands and contracts during heating and cooling. Such motion must be permitted by the supporting structure so that undue stresses will not be placed upon the pipe. However, in situations wherein the pipe moves rapidly relative the adjacent wall, the motion is to be arrested. Such situations may occur, for example, during an earthquake, during a break in the pipe which would tend to make the pipe whip back and forth under the force of issuing steam, or during jarring motions which occasionally occur in thermal movement such as when other supporting structures prohibit normal thermal movement until a predetermined force is reached. The motion arrestor 21 is therefore designed to protect not only the pipe from damage, but personnel adjacent the pipe from injury occasioned by excessive motion of the pipe.

Figure 2:
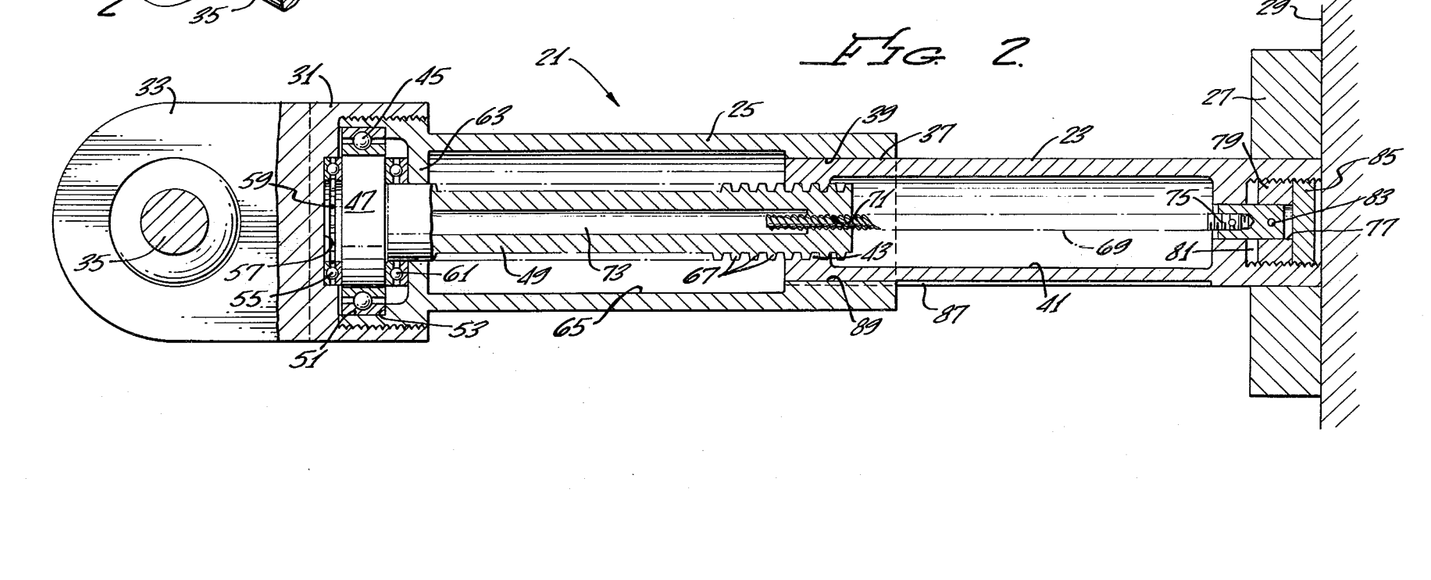
FIG. 2 is a sectional view of the arrestor of FIG. 1 taken along lines 2—2 of FIG. 1.

Referring now to FIG. 2, the operation of the motion arrestor 21 will be described. The first telescoping member 23, as previously described, includes a flange 27 rigidly connected to one relatively movable member 29. Similarly, the cap 31 connects a second relatively movable member 35 to the second telescoping member 25. The flange 27 may be welded or otherwise rigidly secured to the telescoping member 23. This telescoping member 23 includes an external cylindrical bearing surface 37 which engages a cylindrical internal bearing surface 39 at one extremity of the second telescoping member 25. These bearing surfaces 37 and 39 maintain the telescoping members 23 and 25 in axial alignment during telescoping action. The telescoping member 23 includes an internal cylindrical cavity 41 and an internal shoulder at one extremity of the cavity 41 which includes internal nonoverhauling threads 43. As used in the present disclosure, nonoverhauling threads are threads which will not induce rotary motion in response to axial forces, while overhauling threads are threads which will induce such rotary motion in response to axial forces.

Mounted between the second telescoping member 25 and its threaded cap 31 is a radial thrust bearing 45, typically a ball bearing, which serves to radially support a cylindrical flange 47 at one extremity of a second nonoverhauling threaded member 49. The first telescoping member 23 thus forms a first nonoverhauling threaded member which engages the second nonoverhauling threaded member 49 in a manner described in more detail below. The radial ball bearing 45 is conveniently positioned within an enlarged diameter recesss 51 at one extremity of the second telescoping member 25 and is clamped against a shoulder 53 of this recess 51 when the cap 31 is threaded onto the second telescoping member 25.

A first axial thrust bearing 55 is positioned between the end of the cylindrical flange 47 and the bottom 57 of a recess 59 within the cap 31 which houses the cylindrical flange 47. A second axial thrust bearing 61 is positioned between the cylindrical flange 47 and an internal annular shoulder 63 which separates the cavity 59 from the main internal cylindrical cavity 65 of the second telescoping member 25. As can be seen, when the cap 31 is threaded onto the second telescoping member 25 the cylindrical flange 47 is clamped axially between the bearings 55 and 61. The arrangement of the bearings 45, 55 and 61 about the flange 47 of the second nonoverhauling threaded member 49 permits rotational movement of the second nonoverhauling threaded member 49 relative the threaded cap 31 and pillow block 33, but prohibits any relative axial movement between the second nonoverhauling threaded member 49 and the pillow block 33. In addition, the bearings 45, 55, and 61 maintain the second nonoverhauling threaded member 49 axially aligned within the second telescoping member 25. Virtually the entire length of the second nonoverhauling threaded member 49 is externally threaded with acme threads 67 which are designed to interengage with the threads 43 of the first threaded member 23 in a manner described below.

Figure 3:
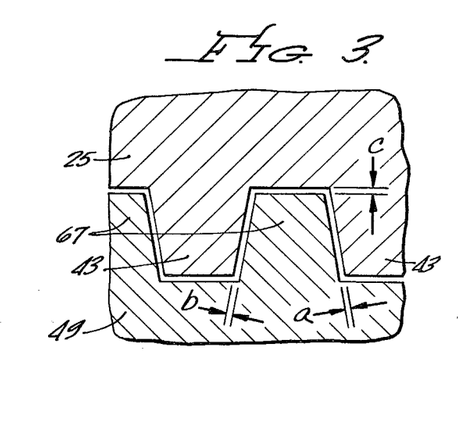
FIG. 3 is an enlarged, partial sectional view taken along line 2—2 of FIG. 1, showing the interengagement of the noncontacting nonoverhauling threaded members.

Referring now to FIG. 3, the nonoverhauling threaded interengagement of the first threaded member 23 with the second threaded member 49 will be described. The threads 43 and 67 are machined onto the elements 23 and 49 respectively to permit the threads to interengage without contacting. As used in this disclosure, interengaging threaded elements as shown in FIG. 3 are positioned with the crests of the threads of one element positioned between the crests of threads of the alternate element, but the threads are machined with sufficient clearance so that such interengagement is possible without any thread contact. In order to maintain this clearance, such as the clearances shown at a, b and c in FIG. 3, it is necessary that the second overhauling threaded element 49 be axially synchronized with the first overhauling threaded element 23, and it is likewise necessary that the axial alignment of the threaded elements 23 and 49 be accurately maintained.

Referring again to FIG. 2, it will be understood that the axial alignment between the threaded elements 23 and 49 is maintained by the telescoping bearing surfaces 37 and 39 as well as the bearings 45, 55 and 61 which support the cylindrical flange 47 of the second nonoverhauling threaded member 49. The maintenance of axial position of the threaded elements to provide synchronism of the threads and the resulting proper clearances a and b of FIG. 3 will be described below.

An overhauling threaded member 69 mates with and engages an overhauling internally threaded bore 71 at one extremity of the second nonoverhauling threaded member 49. This second threaded member 49 includes a cylindrical internal cavity 73 for receiving the overhauling threaded member 69 to permit this member 69 to extend well within the second threaded member 49. As explained previously, axial forces between the second threaded member 49 and the overhauling threaded member 69 will produce relative rotary motion between these elements.

The other end of the overhauling threaded member 69 is mounted within a cylindrical bearing block 75, which block 75 is positioned within a cylindrical bore 77 of an externally threaded nut 79 which is threaded into an external cavity 81 at one end of the first telescoping member 23. The cylindrical block 75 is maintained axially within the bore 77 by a shear pin 83 which passes through both the cylindrical block 75 and the nut 79. This shear pin 83 is designed to maintain the relative axial position of the cylindrical block 75 and the nut 79 until the shear limit of the pin 83 is reached at which time the pin 83 will shear and permit relative axial motion between the cylindrical block 75 and the nut 79.

The nut 79 is threaded into the cavity 81 to a position which synchronizes or aligns the threads 43 and 67 of the first and second nonoverhauling threaded members 23, 49 to provide the clearances a and b of FIG. 3. In this position, the nut 79 is locked by threading a locknut 85 into the cavity 81 to abut and frictionally maintain the nut 79.

It will be realized that, as the nut 79 with the shear pin 83 intact is threaded into and out of the cavity 81, a force will be applied to the overhauling threaded member 69 which will cause rotation of the second threaded member 49. The second threaded member 49 will rotate until the threads 67 are properly synchronized as shown in FIG. 3 with the threads 43, at which point the initial adjustment of the strut 21 is completed and the locking nut 85 may be installed. It will also be recognized that, if the nut 79 is threaded further into the cavity 81, the second threaded member 49 will continue to rotate until the clearance a of FIG. 3 is removed. At this point the nonoverhauling threads 67 and 43 will engage, prohibiting further motion of the nut 79. Likewise, as the nut 79 is threaded out of the cavity 81, the clearance b of FIG. 3 will be eliminated and the engagement of the nonoverhauling threads 43 and 67 will again prohibit further motion of the nut 79. By sensing these two motion extremes, an operator may thread the nut 79 to a position midway between these extremes and thus synchronize the threading as shown in FIG. 3.

During use of the device shown in FIGS. 1 through 3, the application of axial forces to the arrestor 21 will be transmitted through the second nonoverhauling member 49 and the overhauling threads 71, through the block 75 and shear pin 83 to the flange 27. So long as these axial forces are insufficient to shear the pin 83, the overhauling thread 71 will rotate the second threaded member 49 within the bearings 45, 55 and 61 so that the nonoverhauling threads 43 and 67 will remain interengaged but noncontacting, that is, in synchronism. It is, of course, necessary that the pitch and direction of the overhauling threads 71 be identical with the pitch and direction of the nonoverhauling threads 67 and 73 for this operation to occur. Thus, while the thread pitch is identical, the difference in diameters between the threaded member 69 and the threaded members 23 and 49 is sufficient to make one thread combination overhauling while the other thread combination is nonoverhauling. More specifically, typical thread angles of the nonoverhauling threads on elements 23 and 49 is less than 12°, while typical thread angles of the overhauling threads 71 is greater than 18°, this difference in thread angle being the result of identical thread pitch on different diameter shafts. The threads 71 may be multiple, as shown, if desired.

The rotation of the second threaded member 49 by the overhauling threaded member 69 is opposed by the rotary inertia of the threaded member 49 itself and the enlarged cylindrical flange 47. Thus, as the overhauling threaded member 69 accelerates axially into or out of the cavity 73, a corresponding rotary acceleration of the second threaded member 49 and its flange 47 must occur. When a high acceleration motion is imparted to the flange 29, the force required to impart the necessary rotary acceleration to the second threaded member 49 and the flange 47 exceeds the shear limit of the pin 83 and the pin 83 will shear. This permits relative movement between the nut 79 and the cylindrical block 75 so that the overhauling threaded member 69 can no longer maintain the synchronism between the threads 43 and 67. The threads 43 and 67 will thus engage and, since they are nonoverhauling, the friction between these threaded members will lock the strut 21 in the position it has achieved at the time of shearing of the pin 83. As will be noted, the large forces which may now be applied to the pipe 35 are transmitted directly through the first and second nonoverhauling acme threaded members 23 and 49 to support large forces, the nonoverhauling threaded member being free to move within the nut 79 and bearing no force load. This design therefore permits direct load bearing between the high strength, nonoverhauling acme threads 43 and 67 and permanently locks the strut 21 in the position at which the pin 83 shears, regardless of the removal of the accelerating forces. In order to reactivate this strut 21, a new shear pin 83 must be fitted. Until such repair is made, the strut 21 is permanently fixed in a rigid axial position once the acceleration threshold which shears the pin 83 has been achieved.

It can be seen that the embodiment of FIGS. 1 through 3 is a purely acceleration responsive device. Thus, if the relative acceleration between the support 35 and flange 27 is maintained below the threshold which shears the pin 83, high velocity travel may be achieved. The pin 83 will shear only when the axial force which it is able to apply to the overhauling threads 71 is insufficient to impart the necessary rotation to the second threaded member 49 and its enlarged cylindrical flange 47. Until this acceleration threshold is achieved, the overhauling threaded member 69 will rotate the second nonoverhauling threaded member 49 to screw the nonoverhauling threads 67 into the nonoverhauling threads 43 in a synchronous manner as shown in FIG. 3.

As a precaution to assure that the first and second telescoping members 23, 25 do not rotate relative one another, a keyway 87 is formed axially along one side of the tubular member 23 and is received within a key slot 89 formed in the second tubular member 25. The resistance of the telescoping members 23 and 25 to relative rotation is important for the maintenance of the threads 67 and 43 in a synchronized position.

The acceleration threshold of the arrestor 21 of FIGS. 1–3 may be calibrated or changed by varying the rotational inertia of the nonoverhauling threaded member 49 or its flange 47, or by changing the shear strengh or diameter of the shear pin 82.

Figures 4, 5:
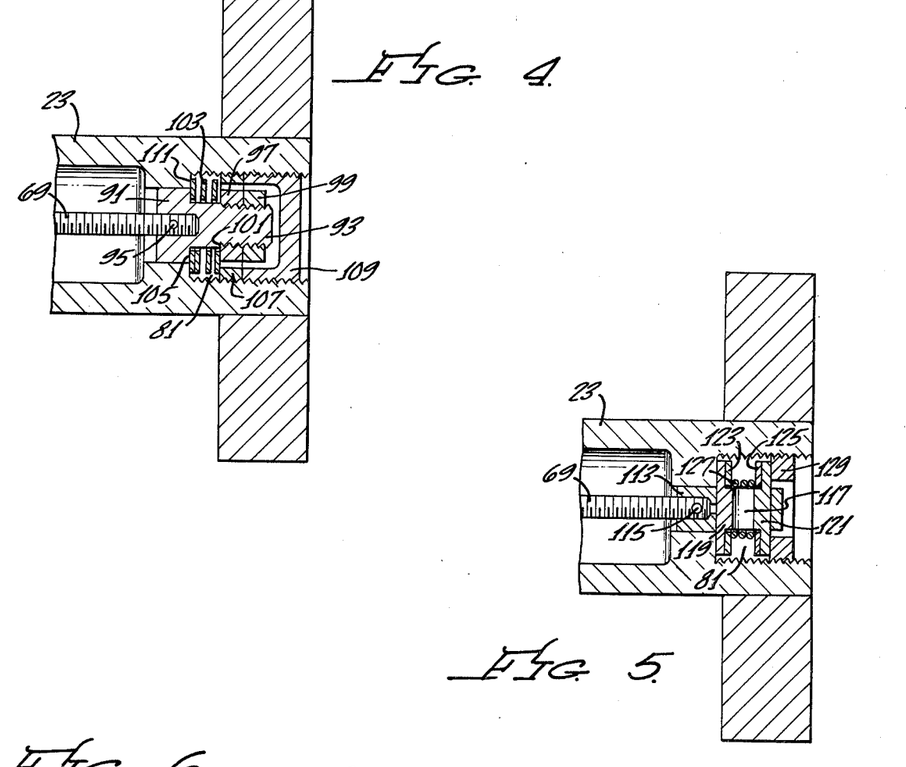
FIG. 4 is a partial sectional view similar to one end of FIG. 2 showing an alternate apparatus for connecting the overhauling threaded member of the arrestor of FIG. 2.
FIG. 5 is a partial sectional view similar to one end of FIG. 2 showing a second alternate apparatus for connecting one end of the overhauling screw of the arrestor of FIG. 2.

While the embodiment of FIGS. 1 through 3 is satisfactory for permanently prohibiting relative motion between the telescoping members 23 and 25 once a predetermined acceleration threshold has been surpassed, the embodiments of FIGS. 4 and 5 show alterations in the end connection of the overhauling threaded member 69 which permit repeated operation of the device to arrest motion and to thereafter permit motion when the original forces have been removed from the motion arrestor 21.

Referring initially to FIG. 4, the end of the overhauling threaded member 69 is shown rigidly attached to a bearing block 91 which includes a threaded extension 93. The overhauling threaded member 69 may be pinned, as with a pin 95, to the bearing block 91 to assure that no relative motion will occur. The nut 97 and locknut 99 are placed onto the threaded extension 93, with the nut 97 preferably screwed against a shoulder 101 on the threaded extension 93 after a flat helical spring 103 has been placed around the threaded extension 93. The spring 103 is a compression spring and is precompressed between a shoulder 105 on the bearing block 91 and the nut 97, the degree of precompression being predetermined by the position of the shoulder 101. The entire assembly of the bearing block 91, spring 103, and nuts 97 and 99 may be rotated within the housing 81 to synchronize the nonoverhauling threads 43 and 67 (FIG. 3), and a nut 107 having external threads for engagement with the internally threaded cavity 81 is threaded into the cavity 81 until it abuts the spring 103. A locking cap nut 109 which is also externally threaded is then threaded into the cavity 81 to lock the position of the nut 107. It can be seen that, as the overhauling threaded member 69 is forced toward the right as viewed in FIG. 4, the shoulder 105 on the bearing block 91 will compress the spring 103 against the nut 107. Similarly, when the overhauling threaded member 69 is forced toward the left as viewed in FIG. 4, the nut 97 will compress the spring 103 against a shoulder 111 at the bottom of the cavity 81. The overhauling threaded member 69 is therefore centered axially within the first telescoping member 23 at a predetermined position which permits interengagement without contact of the nonoverhauling threaded members 43 and 67. The spring 103 is precompressed by the nut 107 so that a predetermined amount of force must be applied against the overhauling threaded member 69 before it will move relative the first telescoping member 23. When this force is achieved in either direction, the spring 103 will compress, permitting relative movement between the overhauling threaded member 69 and the telescoping member 23, and a resulting contact between the nonoverhauling threaded members 43 and 67 and a locking of the strut 21. As soon as the force on the strut 21 which caused the excessive movement is removed, the spring 103 will once again center the overhauling threaded member 69 and thereby synchronize the nonoverhauling threads to permit normal telescoping of the strut 21. It will be recognized, of course, that the operation of the inertia mass comprised of the overhauling threaded member 49 and its cylindrical flange 47 is identical in FIG. 4 to the embodiment of FIG. 2, but that rather than shearing a pin 83, force upon the overhauling threaded member 69 caused by an attempt to accelerate the member 49, 47 rapidly will cause a compression of the spring 103. Thus, the device of FIG. 4 may be repeatedly used. In both cases, of course, once the overhauling threaded member 69 has moved relative the first telescoping member 23 sufficiently to permit contact between the threads 43 and 67, the entire weight of the load supported by the strut 21 is borne through the nonoverhauling threaded members 49 and 23, which members may be made to withstand very substantial forces. Since both of the threaded members 23 and 49 are axially fixed with respect to the end supports 27 and 33, excessive motion is not required to lock the device in a particular position once the acceleration threshold has been achieved. Furthermore, the overhauling threaded member 69 may be made to operate as an extremely effective overhauling member without design limitations which would be imposed if the main load of the arrestor 21 were carried through the overhauling threaded member 69. For this reason it is possible to make the overhauling threaded member 69 with a small diameter so that the thread angle may be relatively steep, thereby eliminating the need for ball nuts or other sophisticated devices to assure proper overhauling of the threads 71, except in very large strut units.

Referring now to FIG. 5, a second alternate embodiment for controlling the axial position of the overhauling threaded member 69 is shown. As with the embodiment of FIG. 4, this embodiment permits repeated use of the motion arresting strut 21 after the strut 21 has locked in position due to the engagement of the nonoverhauling threads 43 and 47. In this embodiment, the overhauling threaded member 69 is rigidly connected to a cylindrical bearing member 113, as by a pin 115. The cylindrical member 113 includes a transverse slot 117 in which are positioned a pair of elongate pins 119 and 121. Each of the pins 119 and 121 is cut away on both ends to provide flat bearing surfaces for a pair of washers 123 and 125. A compression spring 127 is precompressed between the washers 123 and 125, and the precompression of the spring 127 is supported by the pins 119 and 121 fitted within the ends of the slot 117. Thus, while each of the pins 119 and 121 is free to move along the slot 117 toward the other pin, motion of the pins 119 and 121 away from one another from the position shown in FIG. 5 is prohibited by the ends of the slot 117. These pins 119 and 121 thus hold the spring 127 in a precompressed configuration. The entire assembly of the overhauling threaded member 69, bearing member 113 and pins, washers and springs 119, 121, 123, 125, 127 may be inserted into the cavity 81 in the extremity of the telescoping member 23 and rotated to a position which synchronizes the nonoverhauling threaded elements 43 and 67. An externally threaded nut 129 is then screwed into the aperture 81 until it abuts the exterior pin 121.

As relatively slow motion of the telescoping members 23 and 25 occurs, a force will be transmitted by the precompressed spring 127 through the overhauling threaded member 69 to rotate the nonoverhauling threaded member 49. So long as the force required to rotate the member 49 is below the precompression load of the spring 127, the overhauling threaded member 69 will maintain the nonoverhauling threaded elements 43 and 67 in synchronism, so that these elements, although interengaged, do not contact. However, as the force required to rotationally accelerate the member 49 and its cylindrical flange 47 at the speed required by the acceleration of the telescoping members 23 and 25 exceeds the precompression of the spring 127, the overhauling threaded member 69 will move relative the telescoping member 23, as in the embodiment of FIG. 4. This movement in one direction will decrease the clearance a of FIG. 3 and in the other direction will decrease the clearance b of FIG. 3 until, with a predetermined force load, the overhauling threaded elements 43 and 67 will engage to prohibit further extension or retraction of the locking strut 21 and thus arrest the motion.

The force required to permit relative motion between the overhauling threaded member 69 and telescoping member 23 in either of the embodiments of FIGS. 4 or 5 may be preset by changing the precompression load on the compression springs 103 and 127. In addition, the acceleration required to compress the springs 103 and 127 and thus lock the motion arrestor 21 is additionally determined by the rotational inertia of the nonoverhauling threaded member 49 and its cylindrical flange 47. As the rotational inertia of this member is increased or the precompression of the springs 103 and 127 is decreased, the relative acceleration threshold at which the telescoping members 23 and 25 will be locked to one another through the nonoverhauling threaded members 43 and 67 is decreased. Similarly, a decrease in the rotational inertia of the member 49 or an increase in the precompression of the springs 103 or 127 will increase the permitted relative acceleration between the members 23 and 25. These elements are best calibrated through the proper selection of the rotational inertia of the member 49 and the precompression of the springs 103 and 127, which members may be specifically designed for a particular motion snubbing application. The embodiment shown in FIG. 5, as with the embodiment shown in FIG. 4, may be used repeatedly even though the motion threshold has been previously reached, since, once the forces are removed from the strut 21, the spring 127 will again synchronize the threaded members 43 and 67 so that they are interengaged but do not contact one another, as shown in FIG. 3.

Figure 6:
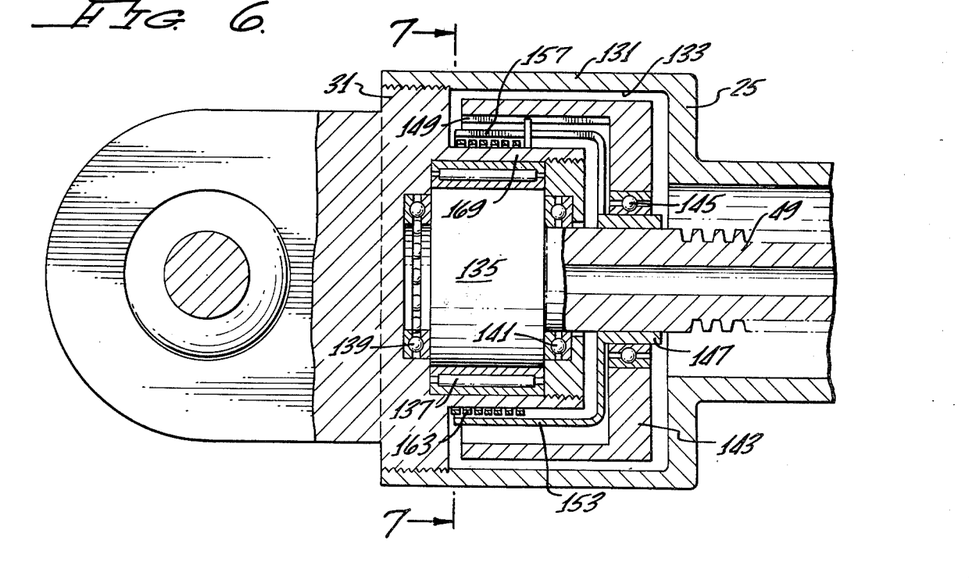
FIG. 6 is a partial sectional view similar to the sectional view of FIG. 2 but showing an alternate acceleration sensing mechanism for controlling the forces applied to the overhauling screw of the device of FIG. 2.
Figure 7:
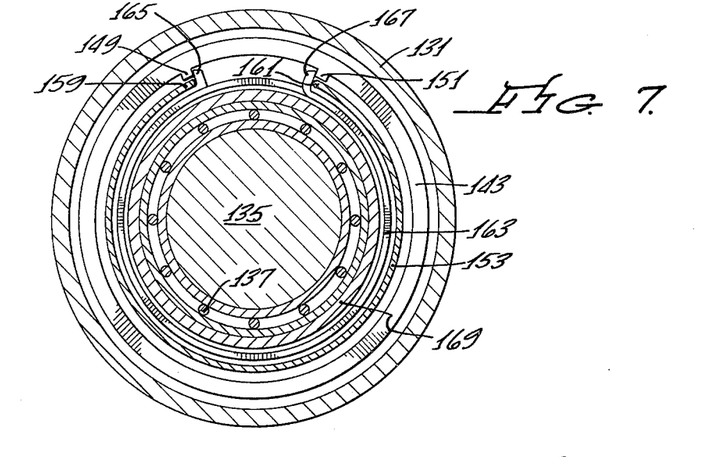
FIG. 7 is a sectional view taken along lines 7—7 of the alternate embodiment shown in FIG. 6.

Referring now to FIGS. 6 and 7 an alternate construction of the second telescoping member 25, nonoverhauling threaded member 49 and the end cap 31 is shown. In this instance, it will be noted that the second telescoping member 25 is internally threaded at one end to receive an externally threaded cap 31. In addition, the second telescoping member 25 includes an enlarged diameter section 131 which provides a housing 133 for additional structural elements which will be described below. The overall purpose of the embodiment of FIGS. 6 and 7 is to increase the acceleration sensitivity of the device of FIG. 2. It will be recognized through a review of the embodiment shown in FIG. 2 that increases in acceleration sensitivity may be accomplished through an increase in the rotational inertia of the member 49 or a decrease in the shear strength in the pin 83. Similarly, increases in sensitivity of the embodiments of FIGS. 4 and 5, as explained previously, requires a reduction in the precompression of the springs 103 or 127 or reduction in the spring constant of these elements. It has been found, however, that these parameters can only be changed within a limited range before the apparatus becomes impractical. In particular, for example, the rotational inertia of the element 49 can only be increased to a certain extent before the packaging of the element becomes bulky. Thus, the embodiment of FIGS. 6 and 7 permits a substantial increase in the sensitivity of the motion arrestor to permit this device to operate at extremely low acceleration thresholds without substantially increasing the overall size of the snubber 21. As in the embodiment of FIG. 2, an enlarged flange 135 is included at one extremity of the threaded member 49. This flange 135 is mounted radially in a bearing 137 and axially between a pair of bearings 139 and 141 so that the threaded member 49 is free to rotate about its axis but is axially fixed relative the end cap 31 as well as the second telescoping member 25.

In addition, the embodiment of FIGS. 6 and 7 includes a second inertia mass 143 in the form of a cup having an aperture at the base of the cup so that the inertia mass 143 may be rotationally mounted, as by a bearing 145, on the threaded member 49. An intermediate ring 147, fixed to the threaded member 49, may be used for mounting the bearing 145. As will be noted from FIGS. 6 and 7, the inertia mass 143 additionally includes a pair of axial ribs 149 and 151 which extend radially inward from the periphery of the cupped element.

A torque transfer drum 153 is mounted on the bearing pad 147 so that it is rigidly fixed to the threaded member 49 and rotates therewith. This transfer drum 153 includes a slot 157 to provide a pair of opposed ends 159 and 161. A helical spring 163 is wound within the transfer drum 153 and supported thereon by means of outturned ends 165 and 167 of the spring 163. Within the spring 163 and forming an extension of the cap 31 is a cylindrical brake tube 169. The exterior surface of this brake tube 169 is slightly spaced from the helical spring 163 when the apparatus is at rest.

In operation, motion which tends to telescope the telescoping members 23, 25 must rotate the threaded member 49. As this element rotates, the torque transfer drum 153 also rotates, and one of the ends 159, 161 thereof will push on one of the ends 165, 167 of the spring 163. This motion will be transferred through the spring 163 to accelerate the inertia mass 143 through interaction of one of the ribs 149, 151 with the other end of the spring 165, 167. Thus, attempts to accelerate the rotation of the threaded member 49 will cause a resulting acceleration of the inertia mass 143 through the intermediary of the spring 169, so long as the acceleration is below a predetermined acceleration threshold. Once this acceleration threshold has been exceeded, the ends 165 and 167 of the helical spring 163 will be driven toward one another, wrapping the spring 163 tightly around the cylindrical braking tube 169, arresting further motion of the threaded member 49. When the rotation of the threaded member 49 is thus arrested, the overhauling screw 69, with an end connection such as shown in one of FIGS. 2, 4 or 5, can no longer maintain the nonoverhauling threaded elements 43 and 67 in synchronism so that these elements will contact one another. It will be understood that for rotation in a first direction, the end 159 of the torque transfer drum 153 will drive the end 165 of the spring 163 in a clockwise direction as viewed in FIG. 7, while the lagging inertia mass 143, through the rib 151, will drive the other end 167 of the spring 163 in a counter-clockwise direction as viewed in FIG. 7, wrapping the spring 163 tightly about the cylindrical braking tube 169. Motion in the other direction will also tend to wrap the spring 163 tightly about the tube 169 so that motion sensitivity in both directions is increased.

Through the use of the embodiment of FIGS. 6 and 7, the response of the device may be substantially increased, since the rotational inertia of the inertia mass 143 as well as the spring constant of the helical spring 163 are added parameters which may be adjusted to change the acceleration sensitivity of the device. Thus, with a relatively low spring constant for the spring 163 and a relatively high inertia for the inertia mass 143, the snubber 21 of the embodiment of FIGS. 6 and 7 may be made extremely sensitive so that the device will prohibit telescoping of the members 23 and 25 at an extremely low acceleration threshold.

Figures 8, 9:
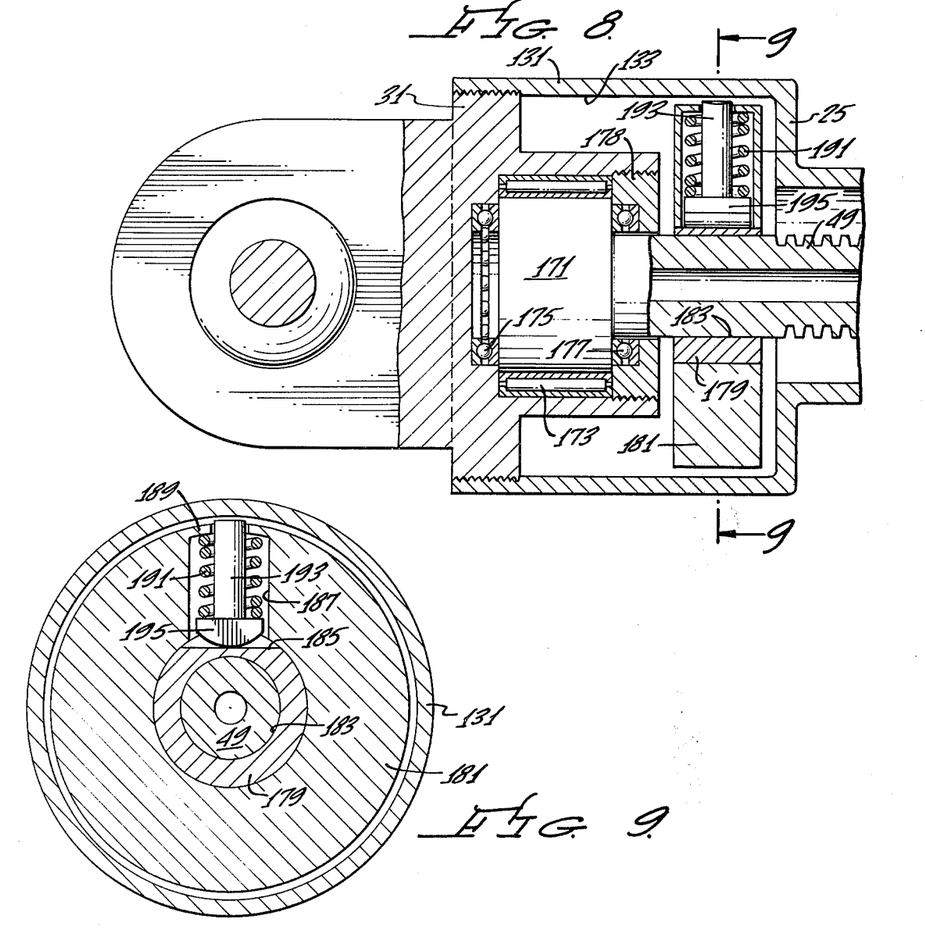
FIG. 8 is a partial sectional view similar to the sectional view of FIG. 2 but showing an alternate acceleration sensing mechanism for controlling the forces applied to the overhauling screw of the motion arrestor of FIG. 2.
FIG. 9 is a sectional view taken along lines 9—9 of the alternate embodiment of FIG. 8.

Referring now to the embodiment of FIGS. 8 and 9, a second alternative configuration at the end of the second telescoping member 25 and threaded member 49 will be described. As in the case of the embodiment of FIGS. 6 and 7, this embodiment is utilized to substantially increase the sensitivity of the motion arrestor 21 to low acceleration levels to provide a low acceleration threshold for locking the nonoverhauling threaded elements 43 and 67 together and thus prohibiting further extension or contraction of the motion arrestor 21. As with the previous embodiments, the threaded member 49 includes an enlarged cylindrical flange 171 which increases the moment of inertia of the threaded member 49 and which serves to mount the threaded member 49 in a fixed axial position relative a threaded cap 31 while permitting relative rotation between the cap 31 and threaded member 49. This mounting is accomplished by a radial ball bearing 173 and a pair of axial thrust ball bearings 175 and 177, all of which are clamped into the threaded cap 31 by an externally threaded nut 178. As in the embodiment of FIGS. 6 and 7, an enlarged diameter portion 131 of the second telescoping member 25 includes a housing 133. Rotationally mounted, as on a bushing 179, is a secondary inertia weight 181. The bushing 179 is rigidly attached to a nonthreaded portion 183 of the threaded member 49 adjacent the flange 171. As shown in FIG. 9, the bushing 179 includes a flat 185. The inertia weight 181 is rotatably mounted on the bushing 179 and includes a radial cylindrical housing 187 extending between the bearing 179 and a reduced diameter annular shoulder 189 which forms a seat for a compression spring 191. The compression spring 191 serves to bias a brake plunger 193 through engagement with an enlarged head 195 of the plunger 193. The plunger 193 is guided for radial movement within the weight 181 by abutment of the enlarged head 195 with the walls of the housing 187 and by abutment of the plunger 193 with the annular shoulder 189. As is clearly shown in FIG. 9, when the head 195 of the plunger 193 is seated on the flat 185 of the bushing 179, the plunger 193 is spaced from the cylindrical wall 131. As the threaded member 49 is rotated, the pressure of the spring 191 on the head 195 will tend to maintain the plunger 193 centered on the flat 185 of the bearing 179, since any relative rotary motion between the inertia weight 181 and the threaded member 49 will induce a camming action between the flat 185 and head 195 to raise the plunger 193 against the pressure of the spring 191. Thus, relatively slow rotation of the threaded member 49 will rotate the inertia weight 181 in synchronism. As the rotary motion of the threaded member 49 accelerates, however, the rotary inertia of the weight 181 will cause the rotation of the weight 181 to lag the rotation of the threaded member 49, since the compression within the spring 191 is insufficient to maintain the plunger 193 centered on the flat 185. The plunger 193 will thus raise and, at a predetermined acceleration threshold, the plunger 193 will engage the cylindrical inner surface of the wall 131 to act as a brake for the inertia mass 181. This engagement of the plunger 193 will prohibit further rotation of the threaded member 49, since the flat 185 will wedge against the head 195 of the plunger 193. Once the threaded member 49 is no longer free to rotate, the overhauling threaded member 69 of any of the alternate end embodiments of FIGS. 1 through 5 will be unable to maintain the nonoverhauling threads in synchronism and, as with the previous embodiment, the motion arrestor 21 will become locked through contact of these nonoverhauling threads. The inclusion of the rotary inertia element 181 therefore increases the sensitivity of the snubber device 21 to low axial acceleration of the telescoping members 23 and 25 and the resulting low radial acceleration of the threaded member 49.

Figure 10:
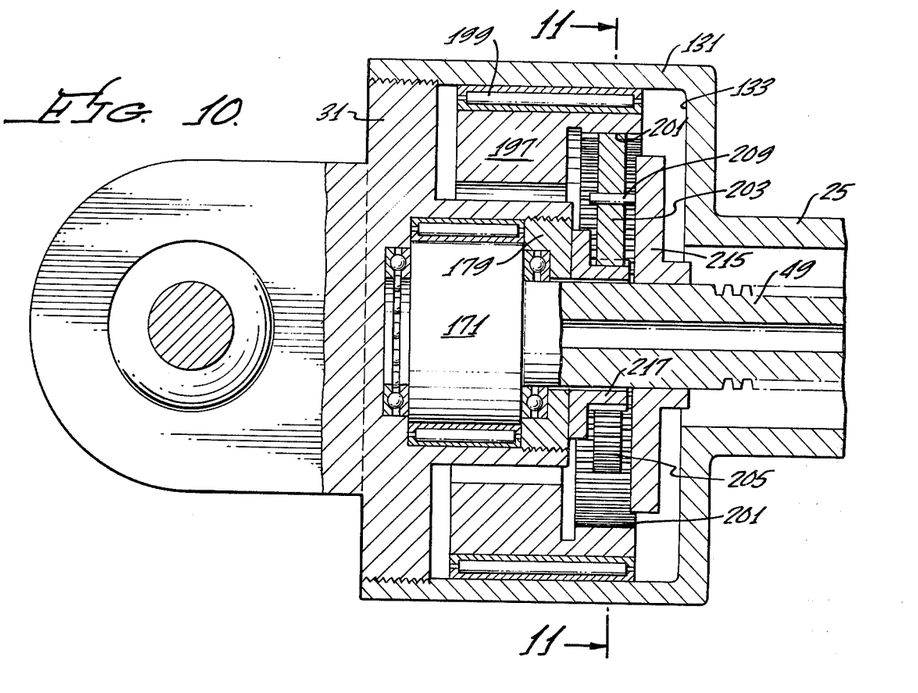
FIG. 10 is a partial sectional view similar to the sectional view of FIG. 2 showing an alternate acceleration sensitive mechanism for controlling the forces applied to the overhauling screw of the motion arrestor of FIG. 2.
Figure 11:
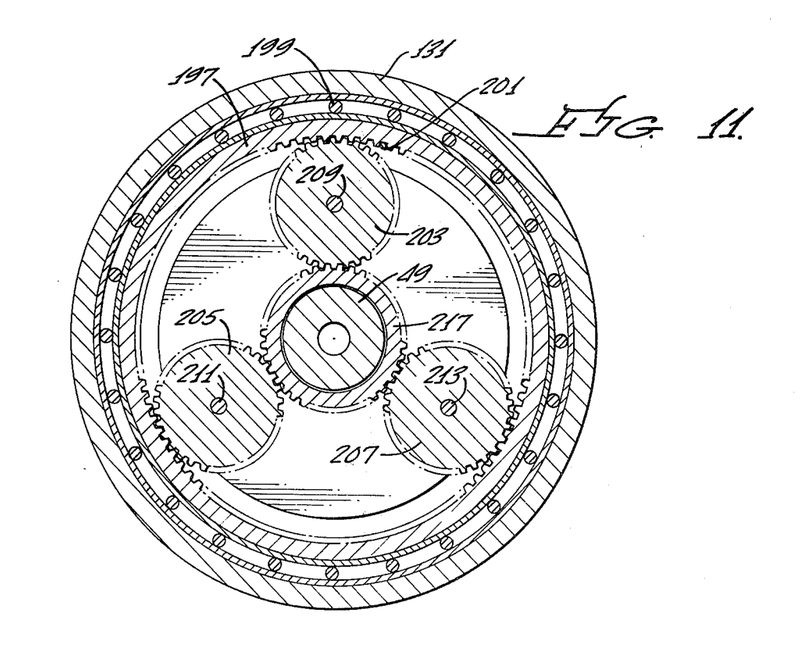
FIG. 11 is a sectional view taken along lines 11—11 of the alternate embodiment of FIG. 10.

Referring now to FIGS. 10 and 11, an additional embodiment for increasing the sensitivity of the motion arrestor of FIG. 2 to low acceleration thresholds is shown. In this embodiment a secondary rotary inertia mass 197 is rotated at a higher speed than the primary inertia mass 171 through a planetary gearing system. The mounting of the threaded member 49 through an enlarged cylindrical flange 171 and associated bearings within a threaded cap 31 is identical to the construction of FIGS. 8 and 9, as is the formation of a housing 133 through an enlarged portion 131 of the telescoping member 25. In this embodiment the secondary inertia mass 179 is mounted for rotation within the cylindrical wall 131 by a roller bearing 199. At one extremity of the inertia weight 197, this weight includes an enlarged internal diameter extension which is internally threaded at 201 to act as the ring gear in the planetary system. Three planet gears 203 through 207 are mounted for rotation on axle shafts 209 through 213 which are, in turn, rigidly fixed to a flange 215 which is rigidly mounted on the threaded member 49 adjacent the cylindrical flange 171. These planet gears 203 through 207 engage the threads 201 of the inertia mass 197 and additionally engage a sun gear 217 which is rigidly mounted to the nut 179 and thereby rigidly mounted to the threaded cap 31. Clearance is provided between the sun gear 217 and the threaded member 49 so that, while the threaded member 49 rotates, the sun gear 217 is fixed to the threaded cap 31 and thus stationary. As is well known, rotation of the threaded member 49 and associated flange 215 will rotate the axles 209 through 213 of the planet gears, causing the planet gears 203 to 207 to walk around the sun gear 217 and impart an accelerated rotation in the same direction to the inertia mass 197. Any acceleration of the threaded member 49 must therefore be accompanied by an increased acceleration of the secondary inertia mass 197. The device will therefore be more sensitive to low level accelerations than was the embodiment of FIG. 2. The acceleration threshold may be adjusted by varying the size of the sun and planet gears of this embodiment or by increasing the mass of the secondary inertia weight 197 to produce a more sensitive device. As with the prior embodiments, any attempt to rotate the threaded member 49 above a predetermined acceleration threshold will be resisted by the inertia of the member 49, its cylindrical flange 171 and the secondary inertia weight 179, causing shearing of the pin 83 of the embodiment of FIG. 2 or a compression of spring 103 or 127 in the embodiments of FIGS. 4 and 5, thus causing contact of the nonoverhauling threaded members 43 and 67 to arrest any further telescoping motion of the device 21.

Figure 12:
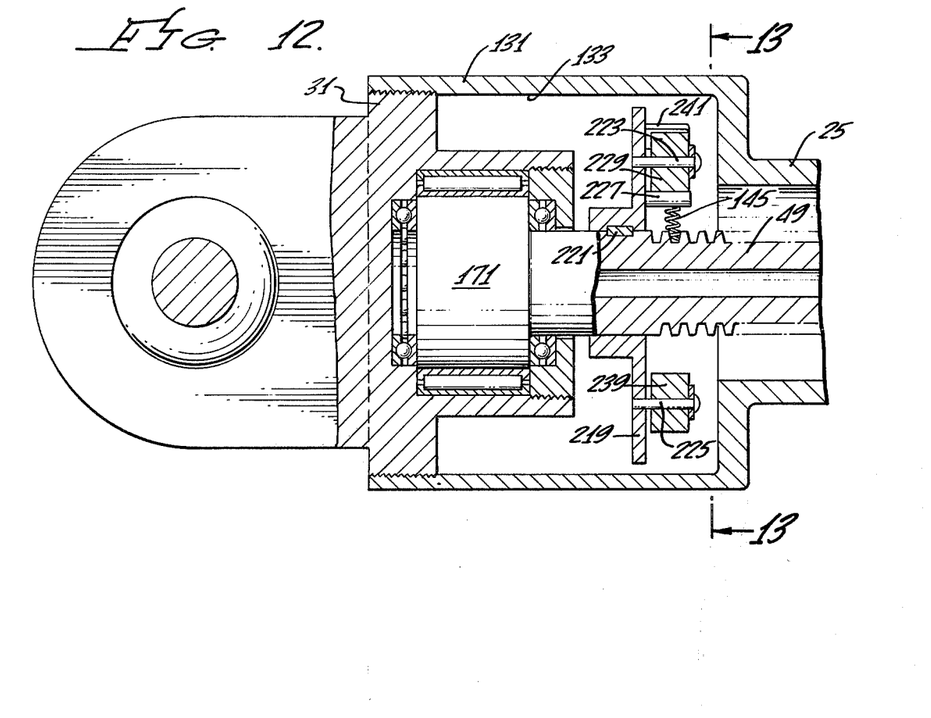
FIG. 12 is a partial sectional view similar to the sectional view of FIG. 2 showing an alternate velocity sensitive mechanism for controlling the forces applied to the overhauling screw of the motion arrestor of FIG. 2.
Figure 13:
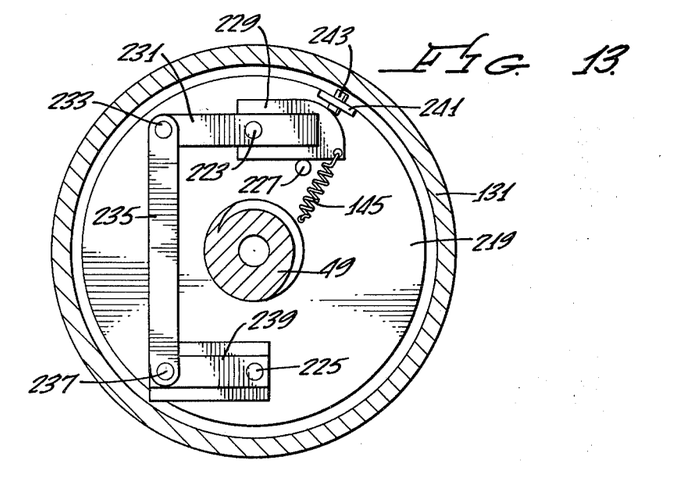
FIG. 13 is a sectional view taken along lines 13—13 of the alternate embodiment of FIG. 12.

Referring now to FIGS. 12 and 13, yet another embodiment for increasing the motion sensitivity of the snubber 21 of FIG. 2 will be described. Unlike the prior embodiments, the snubber of FIGS. 12 and 13 is velocity sensitive in addition to its acceleration sensitivity, and the relative velocity and acceleration sensitivity may be varied to change the essential operating characteristics of the device.

As with the previous embodiment, an enlarged housing 133 is formed by an enlarged diameter portion 131 of the second telescoping member 25, and the enlarged portion 131 receives a threaded end cap 31. Also similar to the remaining embodiments is the mounting of the threaded member 49 through bearings surrounding an enlarged cylindrical flange 171 maintaining the threaded member in a fixed axial position relative the threaded end 31 while permitting relative rotation of these members. A flange 219 is mounted on the threaded member 49 and keyed, as by a key 221, to rotate with this member. The flange 219 supports a pair of outwardly extending axles 223 and 225 and an outwardly projecting stop member 227. A weight 229 is connected to a support bar 231 and this pair of elements is rotatably mounted about the axle 223. The support bar 231 is rotatably connected by a pin 233 to one end of a rod 235 the other end of which is rotatably connected by a pin 237 to a counterweight 239. The other end of the counterweight 239 is rotatably mounted on the second axle member 225. The flange 219 carries a bracket 241 which mounts a braking plunger 243. The plunger 243 is free to move radially within the mounting bracket 241 and is positioned adjacent the interior cylindrical wall of the enlarged diameter portion 131. A tension spring 145 is connected between one extremity of the weight 229 and the flange 219 and serves to bias the weight 229 away from the plunger 243. As can be seen, rotation of the threaded member 49 rotates the flange 219 and the weight 229 and counterweight 239 supported thereon. As this rotation increases, centrifugal force on the weight 229 and counterweight 239 will tend to rotate each of these elements in a counterclockwise direction about the axles 223 and 225, as viewed in FIG. 13, regardless of the direction of rotation of the flange 219 and threaded member 49. When the angular velocity of the threaded member 49 reaches a predetermined threshold, the bias of the spring 145 will be overcome and the weight 229 will force the plunger 243 against the interior cylindrical wall 131. The plunger 243 then acts as a braking mechanism to slow the rotation of the flange 219 and threaded member 49. As has been described previously, this interference with the rotation of the threaded member 49 will serve to cause contact between the normally synchronized nonoverhauling threaded elements 43 and 67 of FIG. 3 and thus arrest any further telescoping motion of the members 23 and 25 of FIG. 1. The use of the plunger 243 assures that this velocity sensing mechanism will operate uniformly regardless of the direction of the rotation of the element 49, and thus regardless of whether the strut 21 is being expanded or contracted, since the plunger 243 assures that the counterweight 249 will not be affected by the braking action as would occur if direct contact were present between the counterweight 229 and the cylindrical wall 131.

In the embodiment of FIGS. 12 and 13, the mass of the cylindrical flange 171 may be decreased and the weight of the element 229 and the counterweight 239 may be increased to exaggerate the velocity sensitivity of the device while minimizing the acceleration sensitivity of the device. Thus, by varying the rotary inertia of the element 171 and the mass of weights 229 and 239, an endless variety of velocity and acceleration threshold characteristics may be achieved for the device. As with the other embodiments, the embodiment of FIGS. 12 and 13 may be combined with the embodiments of FIGS. 2, 4 or 5 at the other end of the arresting device 21 to provide a variety of configurations permitting permanent locking of the strut or repeatable usage as desired.

Figure 14:
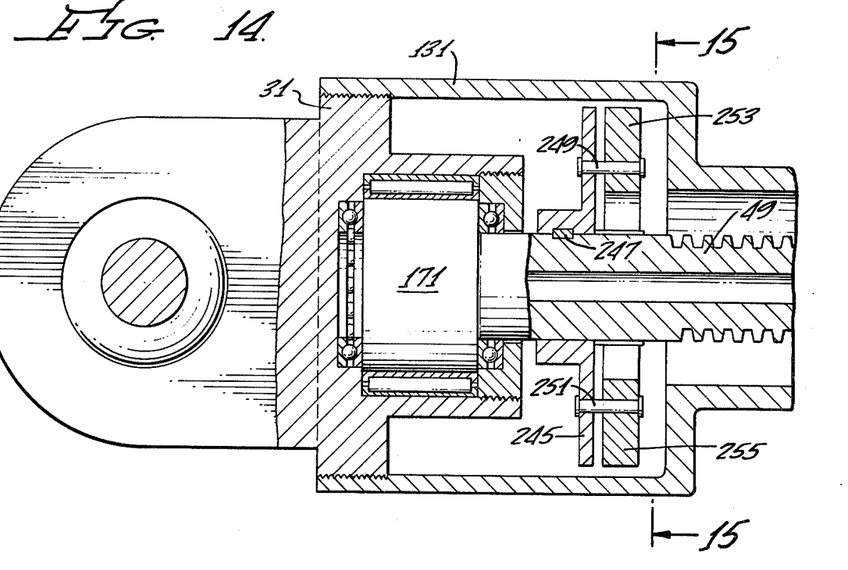
FIG. 14 is a partial sectional view similar to the sectional view of FIG. 2 showing an alternate acceleration sensitive mechanism for controlling the forces applied to the overhauling screw of the motion arrestor of FIG. 2.
Figure 15:
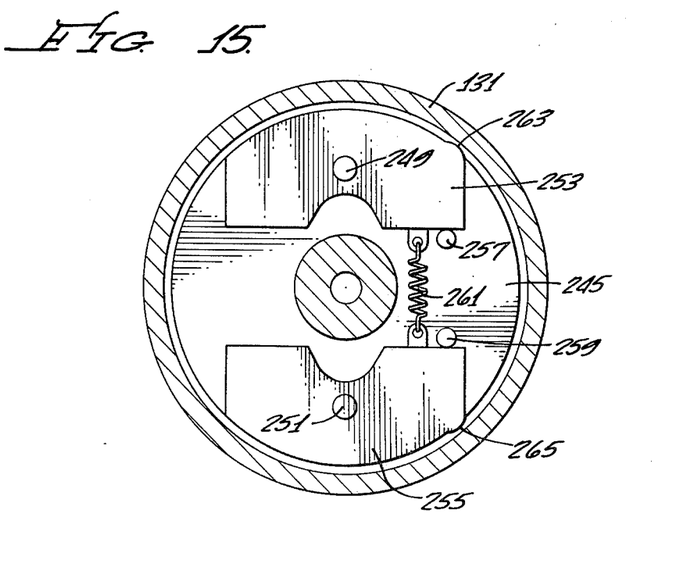
FIG. 15 is a sectional view taken along lines 15—15 of the alternate embodiment of FIG. 14.

Referring to FIGS. 14 and 15, a final embodiment for increasing the acceleration sensitivity of the motion arrestor device will be explained. As in the previous embodiments, the threaded member 49 includes an enlarged cylindrical flange 171 mounted by bearings within a threaded end cap 31 to permit rotary motion of the threaded member 49 relative the cap 31 while prohibiting relative axial movement thereof. In this embodiment, a flange 245 is rigidly mounted, as through a key 247, to the threaded member 49 adjacent the cylindrical flange 171. The flange 245 mounts a pair of axle members 249 and 251. The axle members 249 and 251, in turn, mount a pair of inertia weights 253 and 255, respectively, for rotation relative the flange 245. In addition, the flange 245 supports a pair of stop pins 257 and 259.

As shown in FIG. 15, each of the masses 253 and 255 is equally weighted on alternate sides of the mounting pins 249 and 251 so that, regardless of the rotational speed of the flange 245, without acceleration, no movement is imparted to the weights 253 and 255 relative the flange 245. A tension spring 261 connects one side of the weight members 253 and 255 and positions these members against the stops 257 and 259, respectively. When acceleration is imparted to the flange 245 in a clockwise direction, as viewed in FIG. 15, both of the weights 253 and 255 will tend to rotate in a counterclockwise direction about pins 249 and 251, respectively. Rotation of the weight 255 will be prohibited by the stop pin 259. The weight 253, however, will rotate in a counterclockwise direction until a braking surface 263 thereon abuts the inner wall of the enlarged diameter portion 131. This abutment will tend to impede rotation of the flange 245 relative the wall 131 and thus impede rotation of the threaded member 49. Similarly, accelerated rotational movement of the flange 245 in a counterclockwise direction will tend to rotate the weights 253 and 255 in a clockwise direction about the mounting axles 249 and 251 respectively. Rotation of the weight 253 is prohibited by the stop pin 257 while rotation of the weight 255 is limited only by the tension spring 261. When the spring bias is overcome, the weight 255 will rotate so that a braking surface 265 will contact the inner surface of the enlarged diameter portion 131 impeding rotation of the threaded member 49. Thus, in either direction, the device increases the sensitivity to angular acceleration of the threaded member 49 and permits an adjustment of the acceleration threshold at which the braking surfaces 263 and 265 will contact the wall 131 through variations in the spring constant and initial bias of the spring 261. As will be readily recognized, a pair of springs may replace this spring 261, each of the springs connected to the flange 245 and one of the weights 253 and 255 to permit different acceleration thresholds in different directions of rotation of the flange 245, resulting in different thresholds depending upon whether the motion arrestor 21 is being expanded or retracted.

It will be recognized by those skilled in the art that any of the velocity and acceleration amplification devices shown in the embodiments of FIGS. 6 through 15 may be combined with any of the threshold sensors shown in FIGS. 2, 4 and 5 to provide a wide variety of devices. In each of these devices, however, motion of the telescoping member 23 in an axial direction relative the telescoping member 25 will move the overhauling threaded member 69 in engagement with overhauling threads 71 of the threaded member 49 and thus tend to rotate the threaded member 49. When the force required to thus rotate the threaded member 49 exceeds the shear strength of the pin 83 or the bias of the spring 103 or 127, relative axial motion between the overhauling threaded member 69 and the telescoping member 23 will occur so that the overhauling threaded member 69 can no longer maintain the nonoverhauling threaded members 23 and 49 in synchronism as shown in FIG. 3. Once this threshold has been achieved, the nonoverhauling threaded members will contact, and the frictional forces therebetween will prohibit further rotation of the threaded member 49, thus locking the telescoping strut 21. This locking configuration will be permanent in the embodiment shown in FIG. 2 regardless of which of the acceleration or velocity amplifying embodiments of FIGS. 6 through 15 is employed, whereas the locking arrangement will be only temporary with the embodiments of FIGS. 4 and 5 since a release of the force causing motion beyond the permitted motion threshold will permit the springs 103 and 127 to again synchronize the nonoverhauling screw threads 43 and 67.

An important feature of this invention is the fact that, once the motion threshold, whether velocity or acceleration, is exceeded, the overhauling threaded member 69 no longer bears the force causing this excessive motion. Rather, the telescoping member 23 with its included nonoverhauling acme threads 43 and the threaded member 49 with its nonoverhauling acme threads 67 directly bear the force so that the overall strength of the apparatus can be substantially increased without increasing the diameter or strength of the overhauling threaded member 69 or utilizing complex ball screw arrangements to make the threaded interconnection 71 overhauling.

While the present invention has been specifically described in relation to a thermal piping system, as in a power plant, it will be understood that motion arrestors have a variety of applications ranging from such piping systems, to artillary pieces, to safety mechanisms for machinery to protect operators thereof. The applications are therefore quite diverse, the device being useful in any installation where a pair of relatively moving parts are permitted to move below a predetermined motion threshold, whether velocity or acceleration, but are to be prohibited from moving once a motion threshold has been achieved.

What is claimed is:

1. An adjustable locking strut for permitting relative motion between first and second mechanical elements below a predetermined motion threshold and for prohibiting such relative motion above said predetermined threshold, comprising:
    a first nonoverhauling threaded member mounted in a fixed axial position on said first mechanical element, said first threaded member mounted for rotation about its axis relative said first mechanical element;
    a second nonoverhauling threaded member mounted rotationally and axially in a fixed position on said second mechanical element, the threads of said first and second threaded members being interengaged and formed with sufficient clearance to prohibit contact therebetween when the threads of said first threaded member are axially centered with respect to the threads of said second threaded member; and
    means for rotating said first threaded member during relative motion of said first and second mechanical elements below said predetermined threshold and for thus maintaining said threads of said first threaded member axially centered with respect to the threads of said second threaded member, said means being inoperative above said predetermined threshold.

2. An adjustable locking strut as defined in claim 1 wherein said means for rotating comprises:
    an overhauling threaded member in threaded contact with said first nonoverhauling threaded member; and
    means for mounting said overhauling threaded member on said second nonoverhauling threaded member, said means maintaining said overhauling threaded member in a fixed axial position relative said second nonoverhauling threaded member when said relative motion between said first and second mechanical elements is below said predetermined motion threshold and permitting relative movement between said overhauling threaded member and said second nonoverhauling threaded member when said relative motion between said first and second mechanical elements is above said predetermined motion threshold.

3. An adjustable locking strut as defined in claim 2 wherein said mounting means comprises:
   a mounting block attached to said overhauling threaded member and slidably positioned within said second nonoverhauling threaded member; and
   a shear pin passing through said mounting block and said second nonoverhauling threaded member.

4. An adjustable locking strut as defined in claim 2 wherein said mounting means comprises:
   a mounting block mounted on said overhauling threaded member, said mounting block slidably positioned within said second nonoverhauling threaded member; and
   a spring positioned between said mounting block and said second nonoverhauling member for biasing said mounting block to a predetermined position relative said second nonoverhauling threaded member.

5. An adjustable locking strut as defined in claim 1 wherein said first nonoverhauling threaded member is externally threaded and said second nonoverhauling threaded member is internally threaded, said second nonoverhauling threaded member additionally comprising a smooth cylindrical external bearing surface, said locking strut additionally comprising:
   a tubular telescoping member coaxial with and surrounding said first nonoverhauling threaded member, said telescoping member rigidly mounted to said first mechanical element, said telescoping member including a smooth internal cylindrical bearing surface for mating with the external bearing surface of said second nonoverhauling threaded member to maintain said first and second nonoverhauling threaded members in relative axial alignment.

6. An adjustable locking strut as defined in claim 5 additionally comprising:
   braking means mounted on said first nonoverhauling threaded member, said braking means being responsive to the rotational acceleration of said first nonoverhauling threaded member for engaging said telescoping member and impeding rotation of said first nonoverhauling threaded member at a predetermined acceleration threshold.

7. An adjustable locking strut as defined in claim 5 additionally comprising:
   braking means mounted on said first nonoverhauling threaded member and responsive to the rotational velocity of said first nonoverhauling threaded member for engaging said telescoping member at a predetermined velocity threshold to impede rotation of said first nonoverhauling threaded member.

8. An adjustable locking strut as defined in claim 5 additionally comprising:
   a rotational inertia mass rotationally connected to said telescoping member; and
   gear means interconnecting said inertia mass and said first nonoverhauling threaded member to rotate said inertia mass in response to rotation of said first nonoverhauling threaded member at a speed greater than the rotational speed of said first nonoverhauling threaded member.

9. An adjustable locking strut as defined in claim 1 wherein said first nonoverhauling threaded member includes an enlarged flange for increasing the rotational inertia of said first nonoverhauling threaded member.

10. An adjustable locking strut as defined in claim 1 additionally comprising:
    bearing means positioned between said first nonoverhauling threaded member and said first mechanical element for fixing the axial position of said first nonoverhauling threaded member relative said first mechanical element while permitting relative rotation of said first nonoverhauling threaded member and said first mechanical element.

11. A mechanism for arresting motion between a pair of mechanical elements above a predetermined motion threshold, comprising:
    a first internally threaded member mounted on one of said pair of mechanical elements;
    a second externally threaded member mounted on the other of said pair of mechanical elements, said member having threads which, when synchronized and engaged with the threads of said first threaded member, do not contact the threads of said first threaded member; and
    means for maintaining the threads of said second threaded member in synchronism with the threads of said first threaded member only when said motion between said pair of mechanical elements is below said motion threshold.

12. A mechanism for arresting motion as defined in claim 11 wherein said first externally threaded member and said second internally threaded member include nonoverhauling threads which are machined with a tolerance which permits said first and second threaded members to engage one another without contact.

13. A mechanism for arresting motion as defined in claim 11 wherein said first internally threaded member is rigidly mounted on said one of said pair of mechanical elements.

14. A mechanism for arresting motion as defined in claim 11 wherein said second externally threaded member is rotatably mounted on said other of said pair of mechanical elements in a fixed axial position relative other of said pair of mechanical elements.

15. A mechanism for arresting motion between a pair of mechanical elements as defined in claim 11 wherein said predetermined motion threshold is an acceleration threshold.

16. A mechanism for arresting motion as defined in claim 11 wherein said predetermined motion threshold is a velocity threshold.

17. A mechanism for arresting motion as defined in claim 11 additionally comprising:
    means for maintaining said first internally threaded member and said second externally threaded member in relative axial alignment.

18. A mechanism for arresting motion as defined in claim 11 wherein said second externally threaded member is rotatably mounted on said other of said pair of mechanical elements, said means for maintaining the threads in synchronism comprising:
    overhauling threads machined in a bore within said second externally threaded member, said bore being coaxial with said second externally threaded member;

an overhauling threaded member threaded into said bore within said second externally threaded member;

means for mounting said overhauling threaded member on said one of said pair of mechanical elements, said means comprising:

means for supporting said overhauling threaded member in a fixed axial position relative said one of said pair of mechanical elements when the axial force on said overhauling threaded member is below a predetermined force threshold and for permitting relative axial motion between said overhauling threaded member and said one of said pair of mechanical elements when the axial force on said overhauling threaded member exceeds said predetermined force threshold.

19. A mechanism for arresting motion as defined in claim 18 wherein said supporting means comprises a shear pin mounting said overhauling threaded member to said one of said pair of mechanical elements.

20. A mechanism for arresting motion as defined in claim 18 wherein said supporting means comprises a pair of springs mounted on said one of said pair of mechanical elements and axially biasing said overhauling threaded member in opposite directions relative said one of said pair of mechanical elements, each of said pair of springs being maintained in a preloaded position.

21. A mechanism for arresting motion as defined in claim 18 additionally comprising:

means for increasing the rotary inertia of said second externally threaded member.

22. A mechanism for arresting motion as defined in claim 11 additionally comprising:

braking means mounted on said second externally threaded member and responsive to the rotary acceleration of said second externally threaded member for impeding rotation of said second externally threaded member relative said other of said pair of mechanical elements.

23. A mechanism for arresting motion as defined in claim 18 additionally comprising:

braking means mounted on said second externally threaded member and responsive to the rotary velocity of said second externally threaded member for impeding rotation of said second externally threaded member relative said other of said pair of mechanical elements.

24. A shock mounting strut for controlling motion between a pair of relatively moving mechanical elements, comprising:

a first nonoverhauling threaded member mounted in an axially fixed, rotatable position on one of said mechanical elements;

a second nonoverhauling threaded member mounted in a fixed axial and rotational position on the other of said mechanical elements, the threads of said first and second members being engaged; and means for rotating said first member during relative movement of said elements below a predetermined motion threshold, said means being inoperable above said motion threshold.

25. A shock mounting strut as defined in claim 24 additionally comprising:

means mounted on said first nonoverhauling threaded member for impeding relative rotation of said first nonoverhauling threaded member and said one of said mechanical elements.

26. A shock mounting strut as defined in claim 25 wherein said impeding means comprises:

an inertia weight rotatably mounted on said one of said mechanical elements; and gear means engaging said inertia weight and said first nonoverhauling threaded member for driving said inertia weight at a higher rotational speed relative said one of said mechanical elements in response to rotation of said first nonoverhauling threaded member relative said one of said mechanical elements.

27. A shock mounting strut as defined in claim 25 wherein said impeding means comprises:

an inertia weight rotatably mounted on said first nonoverhauling threaded member;

resilient means connected to said inertia weight and said first nonoverhauling threaded member for rotating said inertia weight in response to rotation of said first nonoverhauling threaded member relative said one of said mechanical elements; and braking means responsive to the relative rotational position of said inertia weight and said first nonoverhauling threaded member for slowing the rotation of said first nonoverhauling threaded member relative said one of said mechanical elements.

28. A shock mounting strut as defined in claim 27 wherein said inertia weight rotates coaxial with said first nonoverhauling threaded member and wherein said resilient means comprises a compression spring radially mounted within said inertia weight, said braking means comprising:

a plunger mounted for radial reciprocation within said inertia weight, said plunger biased for radial movement relative said inertia weight by said compression spring, said plunger engaging a flat on said first nonoverhauling threaded member.

29. A shock mounting strut as defined in claim 27 wherein said inertia weight rotates coaxially with said first nonoverhauling threaded member and wherein said resilient means comprises a helical spring, said braking means comprising:

a braking drum coaxial with said first nonoverhauling threaded member and rigidly mounted to said one of said mechanical elements, said braking drum positioned adjacent said helical spring; and means connecting one end of said helical spring to said first nonoverhauling threaded member and the other end of said helical spring to said inertia weight for changing the diameter of said helical spring in response to the relative rotational position of said inertia weight and said first nonoverhauling threaded member and for thus engaging said helical spring and said braking drum.

30. A shock mounting strut as defined in claim 25 wherein said impeding means comprises:

a centrifugal weight mounted on said first nonoverhauling threaded member and positioned adjacent said one of said mechanical elements; and means mounted on said first nonoverhauling threaded member for biasing said centrifugal weight away from said one of said mechanical elements.

31. A mechanism for controlling relative motion of two mechanical elements, comprising:

frangible means mounted on said mechanism to break when said relative motion exceeds a motion threshold; and means connected to said elements and responsive to said frangible means for permitting said relative motion below said motion threshold and for permanently prohibiting relative motion of said elements once said motion threshold has been reached and said frangible means has broken.

32. A mechanism for controlling relative motion as defined in claim 31 wherein said relative motion of said two mechanical elements is linear motion and wherein said motion threshold is an acceleration threshold.

33. A mechanism for controlling relative motion as defined in claim 31 wherein said relative motion of said two mechanical elements is linear motion and wherein said motion threshold is a velocity threshold.

34. A mechanism for controlling relative motion as defined in claim 31 wherein said relative motion of said two mechanical elements is linear and wherein said motion threshold is both an acceleration and velocity threshold.

* * * * *